United States Patent
Pearson et al.

(10) Patent No.: US 10,020,152 B2
(45) Date of Patent: Jul. 10, 2018

(54) PLUG-ON NEUTRAL CONNECTION

(71) Applicant: SCHNEIDER ELECTRIC USA, INC., Schaumburg, IL (US)

(72) Inventors: David R. Pearson, Palo, IA (US); Jason Potratz, Iowa City, IA (US)

(73) Assignee: Schneider Electric USA, Inc., Andover, MA (US)

( * ) Notice: Subject to any disclaimer, the term of this patent is extended or adjusted under 35 U.S.C. 154(b) by 0 days.

(21) Appl. No.: 14/899,591

(22) PCT Filed: Jun. 27, 2013

(86) PCT No.: PCT/US2013/048270
§ 371 (c)(1),
(2) Date: Dec. 18, 2015

(87) PCT Pub. No.: WO2014/209325
PCT Pub. Date: Dec. 31, 2014

(65) Prior Publication Data
US 2016/0141134 A1     May 19, 2016

(51) Int. Cl.
*H01H 9/00* (2006.01)
*H01H 11/00* (2006.01)
(Continued)

(52) U.S. Cl.
CPC .............. *H01H 71/08* (2013.01); *H01H 9/20* (2013.01); *H01H 71/10* (2013.01); *H01R 9/2633* (2013.01); *H01R 9/2691* (2013.01); *H02B 1/056* (2013.01)

(58) Field of Classification Search
CPC . H01H 9/00; H01H 11/00; H01H 9/20; H01H 71/08; H01H 71/10; H01H 2003/00;
(Continued)

(56) References Cited

U.S. PATENT DOCUMENTS

| 5,760,339 A | 6/1998 | Faulkner et al. |
| 2011/0002089 A1 | 1/2011 | Sharp |
| 2012/0132506 A1 | 5/2012 | Potratz |

FOREIGN PATENT DOCUMENTS

| DE | 1163937 | 2/1964 |
| DE | 3339365 | 5/1985 |
| EP | 1329733 B1 | 10/2006 |

OTHER PUBLICATIONS

International Search Report and Written Opinion for PCT/US13/48270, dated Nov. 20, 2013, 16pp.
(Continued)

*Primary Examiner* — Anthony R. Jimenez
(74) *Attorney, Agent, or Firm* — Locke Lord LLP

(57) ABSTRACT

A plug-on neutral circuit breaker includes a housing, a neutral terminal, and a biasing member. The neutral terminal is pivotally coupled to the housing and includes a body portion, a first leg, and a second leg. The first leg extends from the body portion in a first direction and the second leg extends from the body portion in a second direction. The biasing member is positioned within the housing and is configured to engage the second leg of the neutral terminal, thereby biasing the neutral terminal in a first rotational direction. The biasing of the neutral terminal in the first rotational direction causes a portion of the first leg of the neutral terminal to be urged into contact with a neutral bar of an electrical distribution apparatus in response to the plug-on neutral circuit breaker being installed in the electrical distribution apparatus.

18 Claims, 15 Drawing Sheets

(51) Int. Cl.
  *H01H 71/08* (2006.01)
  *H01H 9/20* (2006.01)
  *H01H 71/10* (2006.01)
  H02B 1/056 (2006.01)
  H01R 9/26 (2006.01)

(58) Field of Classification Search
  CPC ........... H01H 2003/02; H01H 2009/02; H01H 2009/20; H01H 2203/034; H01R 9/2633; H01R 9/2691; H02B 1/056
  USPC ......... 200/401, 400, 288, 50.19, 50.02, 410, 200/411, 430, 431, 428, 440–442, 318, 200/321, 324, 325, 327, 335, 6 R, 200/50.21–50.27, 43.11, 50.01, 50.03, 200/17 R, 43.01, 43.16; 5/50.21
  See application file for complete search history.

(56) References Cited

OTHER PUBLICATIONS

English Language Machine Translation of German Patent No. DE1163937 dated Feb. 27, 1964, 7 pages.
English Language Machine Translation of German Patent No. DE3339365 dated May 9, 1985, 7 pages.
Extended European Search Report dated Dec. 13, 2016 for EP Application No. 13888019.0, 8 pages.
EP Communication for European Patent Application No. 13888019.0 dated Apr. 11, 2018, 5 pages.

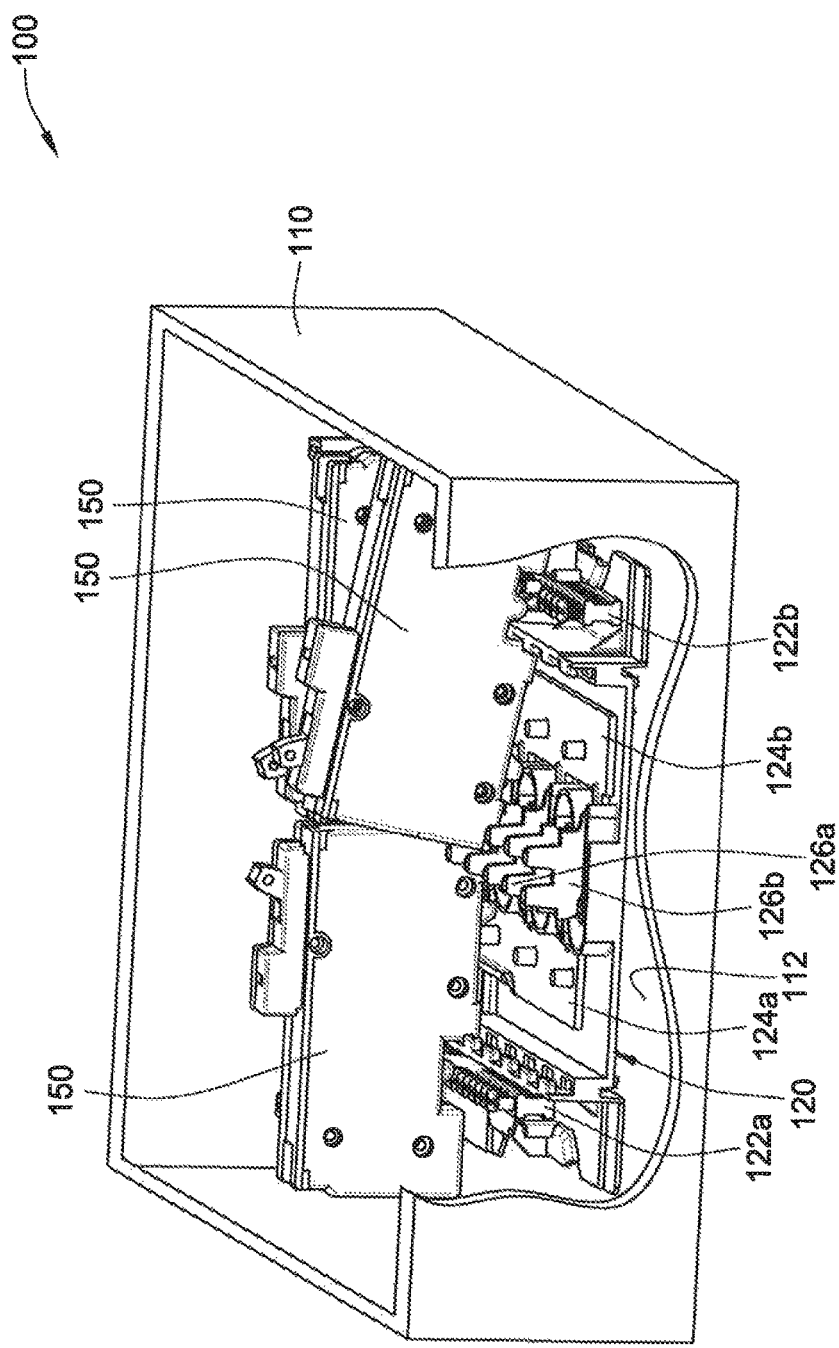

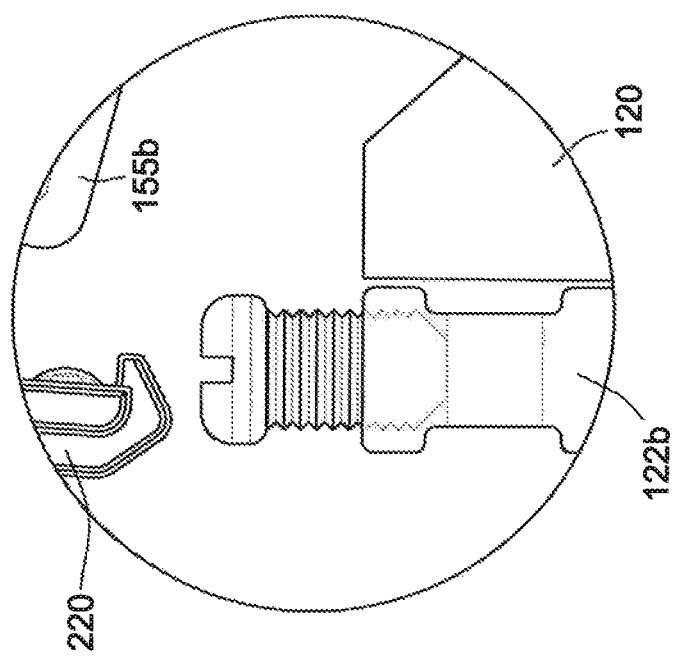
FIG. 4A1

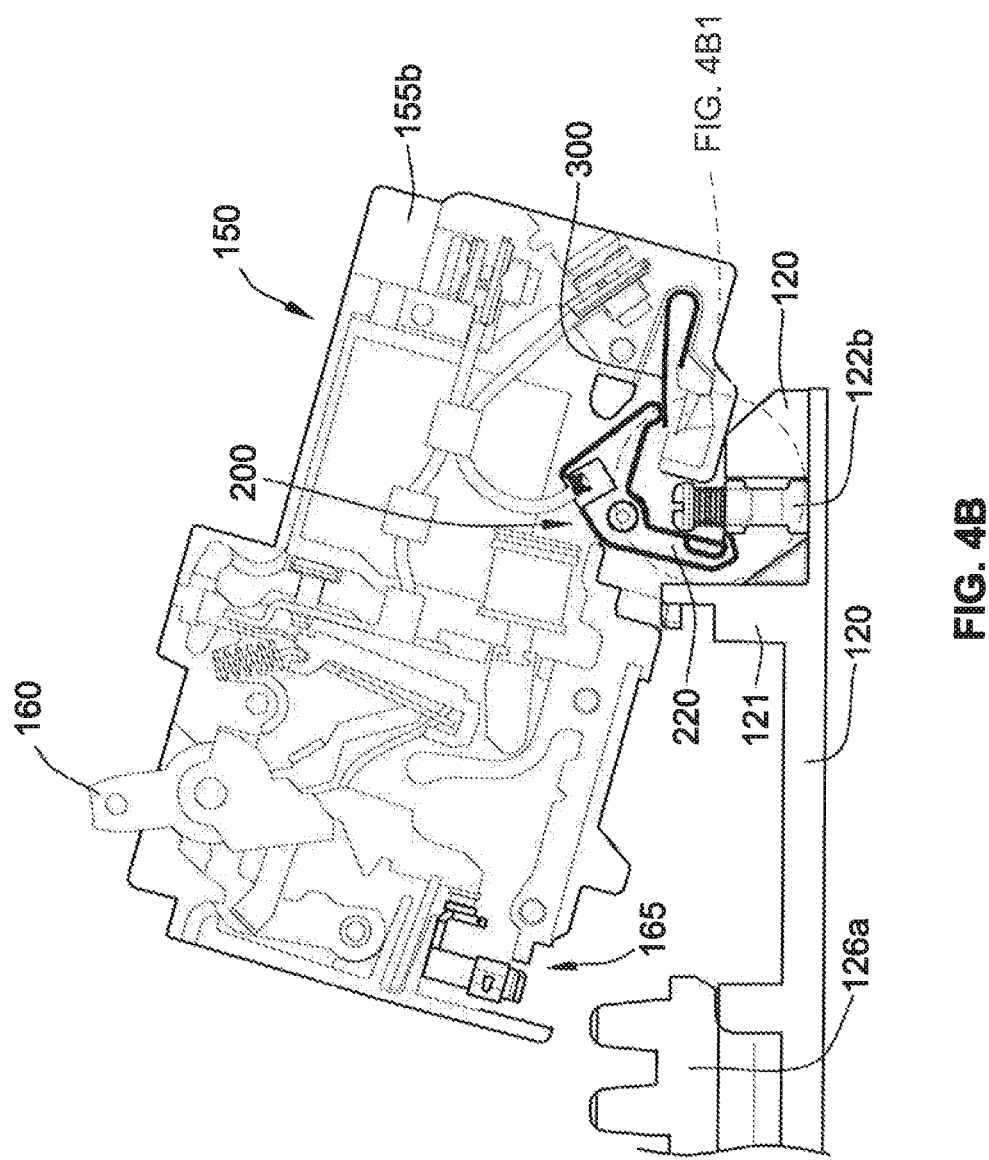

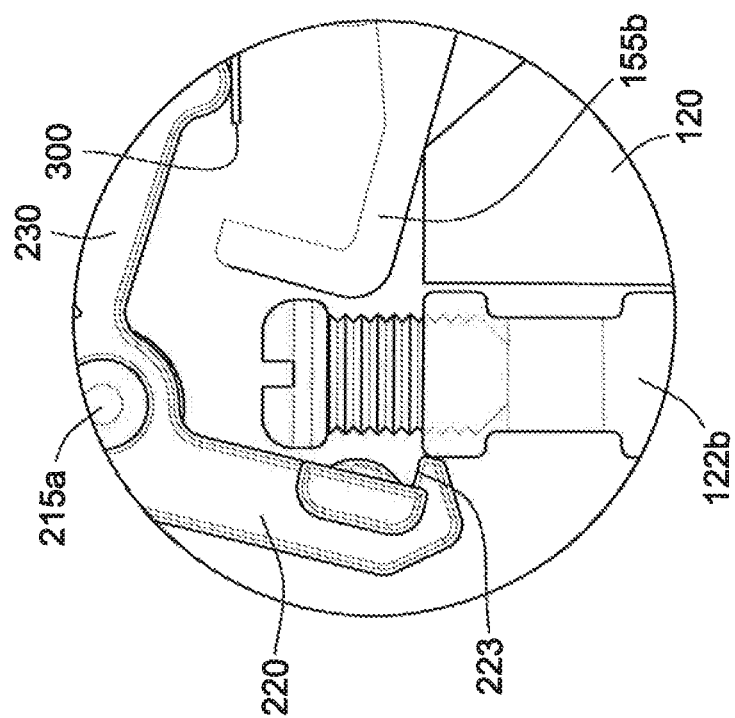

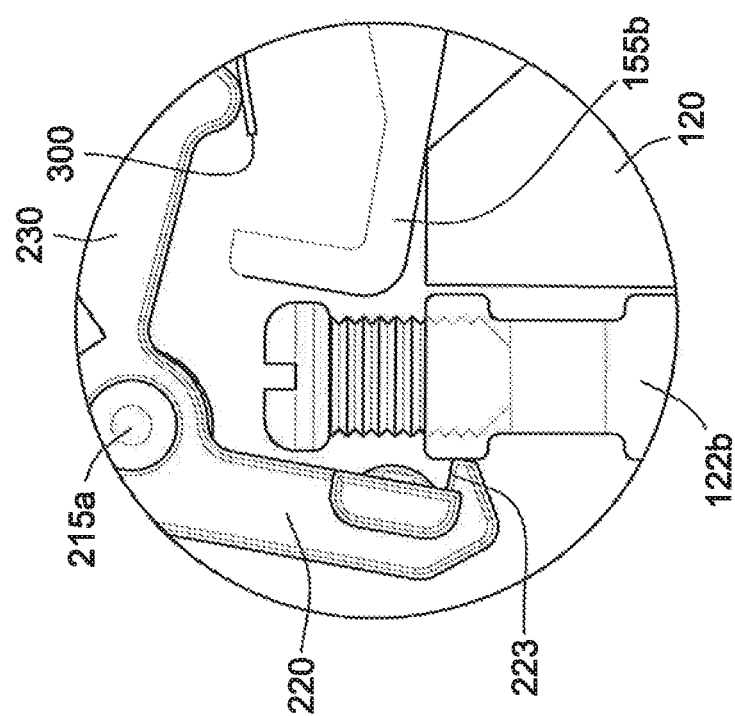

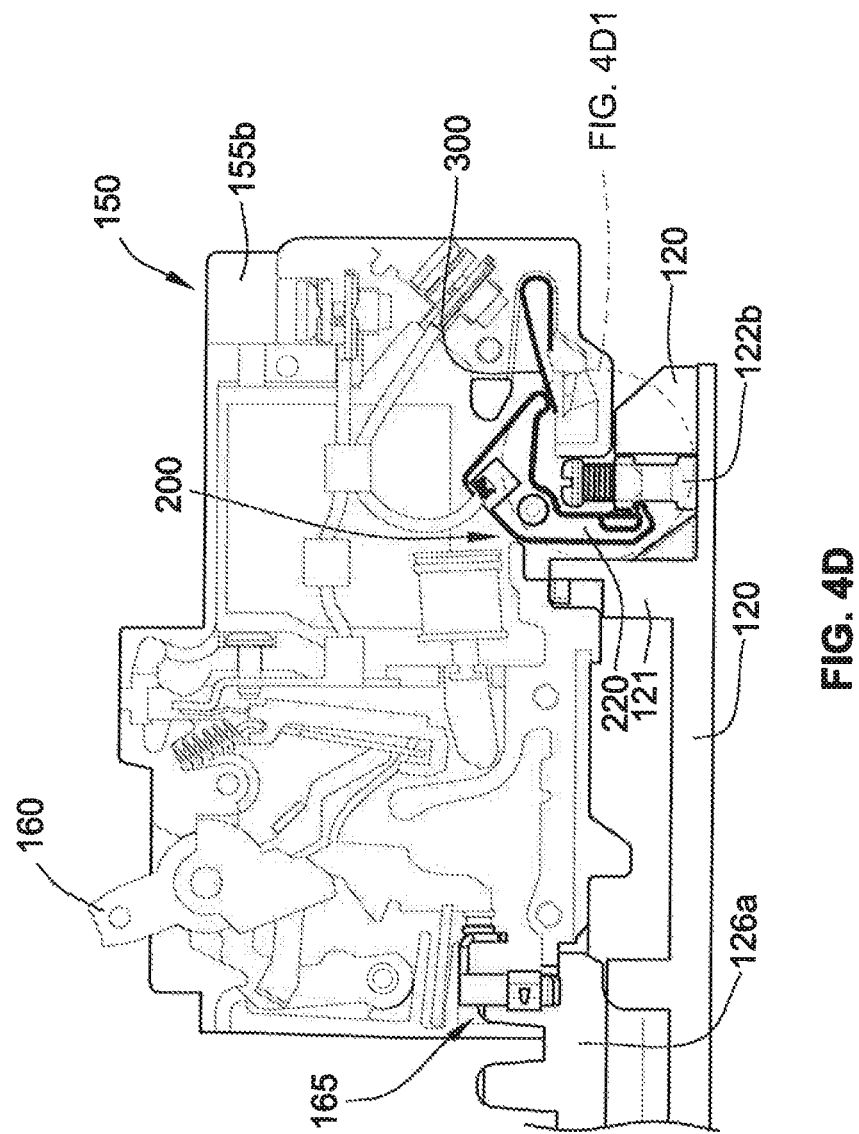

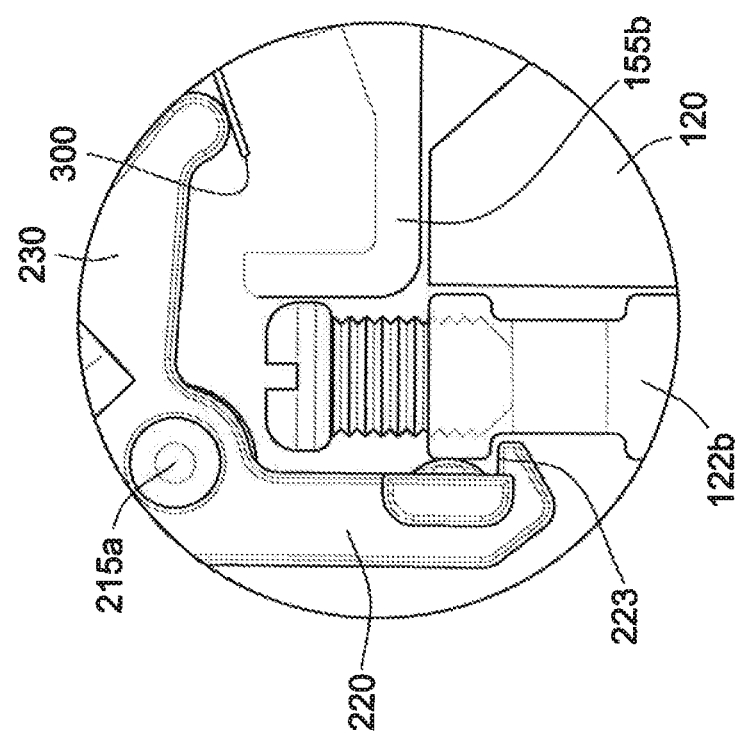
FIG. 4D1

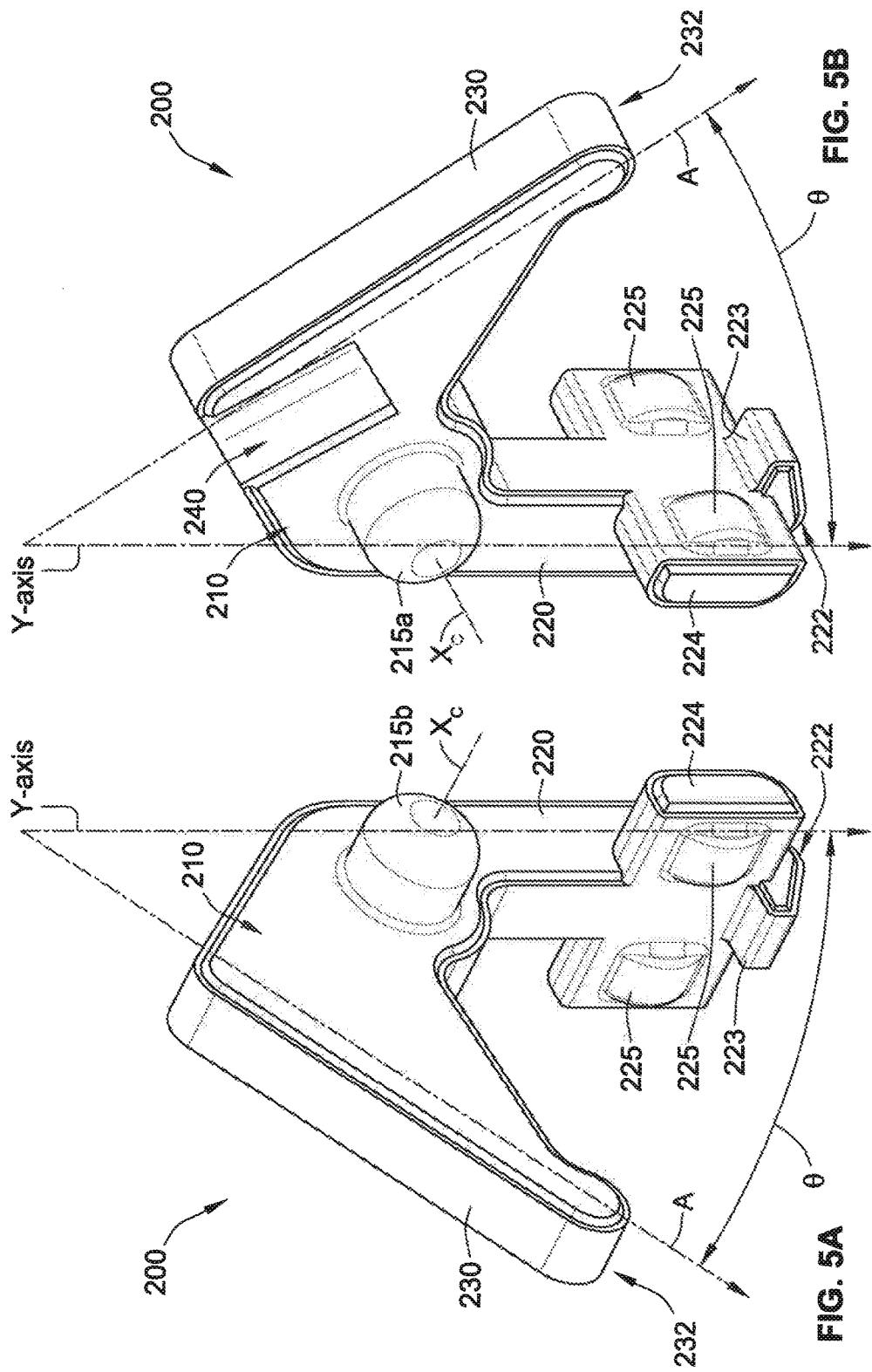

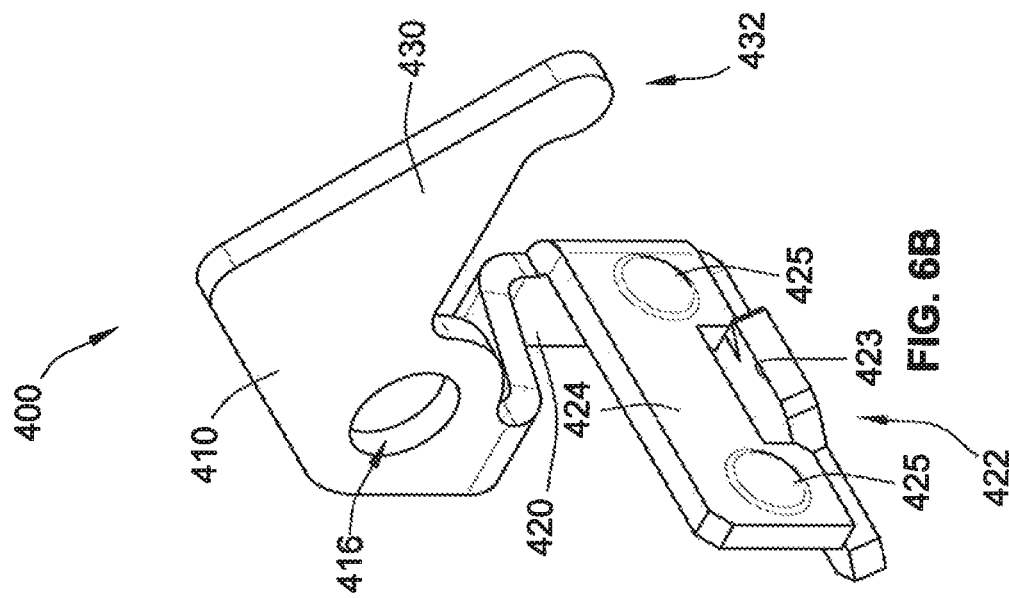
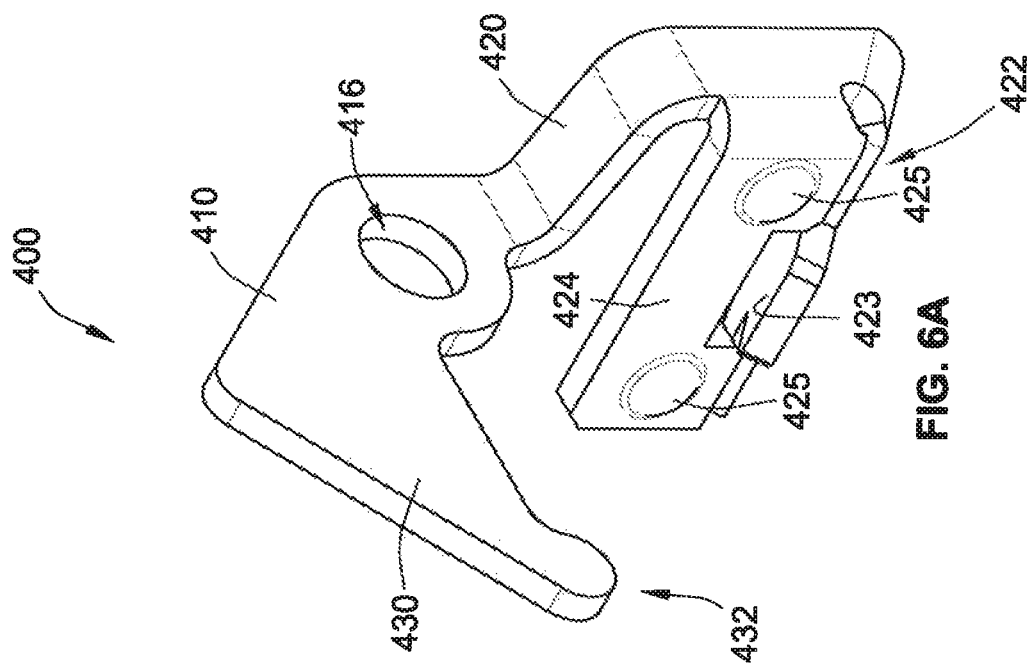

PLUG-ON NEUTRAL CONNECTION

FIELD OF THE INVENTION

The present disclosure relates to electrical distribution equipment and methods of configuring the same, and in particular, to a plug-on neutral circuit breaker featuring a spring-loaded, pivoting neutral terminal that physically and electrically mates with a standard neutral bar mounted within a load center.

BACKGROUND

An electrical distribution apparatus such as a load center or panelboard includes a housing that holds multiple circuit breakers that are connected to various branch circuits in an electrical distribution system. Conventional load centers have a neutral bar with neutral connection pigtail-receiving holes that accept panel neutral conductors from electronic circuit breakers to secure the pigtail conductors from the circuit breakers to the load center by a wire binding screw (e.g., a set screw). Some plug-on neutral circuit breakers typically feature a two-sided jaw or mounting clip that plugs onto a neutral rail without the use of any fasteners (e.g., screws). Such plug-on neutral circuit breakers with two-sides jaws engage (e.g., touch, pinch, clip onto) both sides of a neutral bar to maintain electrical connection with the neutral bar. As such, these two-sided jaws can be overly strained such that they permanently deform when they are installed due to, for example, the wire binding screws of the neutral bar forcing excessive spreading of the two-sided jaws during installation. What is needed is a plug-on neutral circuit breaker capable of mating with a standard neutral bar in preexisting load centers such that the load center is able to accept plug-on neutral circuit breakers without any modifications made to the load center. Aspects of the present disclosure address this and other needs.

BRIEF SUMMARY

According to an implementation of the present disclosure, a plug-on neutral circuit breaker that couples with an existing neutral bar in an electrical distribution apparatus (e.g., a load center or a panelboard) features a neutral terminal that is pivotally coupled to a housing of the plug-on neutral circuit breaker. The neutral terminal has two legs that extend from a body in two different directions. One of the legs is engaged by a biasing member mounted within the housing of the plug-on neutral circuit breaker. The biasing member biases the neutral terminal in a first rotational direction (e.g., counterclockwise) such that a portion of the other one of the legs is urged into contact with the standard neutral bar when the plug-on neutral circuit breaker is installed in the electrical distribution apparatus.

The standard neutral bar typically includes holes that are conventionally used to receive a neutral pigtail conductor of a conventional circuit breaker that does not feature a neutral terminal of a plug-on type. The neutral connection of conventional circuit breakers is often referred to as the pigtail connection as the wire is long to allow installation in various locations. The extra length is helically wound and is referred to as the pigtail. The present disclosure exploits the presence and typical location of the neutral bar in the electrical distribution apparatus without requiring any modifications or attachments to the electrical distribution apparatus, such that the electrical distribution apparatus can receive circuit breakers of the plug-on neutral type. Further, the neutral bar can still be used to receive neutral pigtail conductors of thermal magnetic only conventional-style circuit breakers that are installed in the same electrical distribution apparatus as the circuit breakers of the plug-on neutral type.

Not every aspect of the inventive concepts disclosed herein has been included in this summary. This summary represents one of many ways of implementing an exemplary aspect of the present disclosure. This and other implementations are described in more detail in the description that follows.

The foregoing and additional aspects and embodiments of the present disclosure will be apparent to those of ordinary skill in the art in view of the detailed description of various implementations and/or aspects, which is made with reference to the drawings, a brief description of which is provided next.

BRIEF DESCRIPTION OF THE DRAWINGS

The foregoing and other advantages of the present disclosure will become apparent upon reading the following detailed description and upon reference to the drawings.

FIG. 1 is a perspective view of a portion of an electrical distribution apparatus including housing and a plurality of plug-on neutral circuit breakers therein;

FIGS. 4A, 4B, 4C and 4D are side views of a portion of the electrical distribution apparatus of FIG. 1 illustrating the plug-on neutral circuit breaker of FIG. 2A being coupled with a stab and a neutral bar of the electrical distribution apparatus according to some aspects of the present disclosure;

FIG. 4A1, 4B1, 4C1 and 4D1 are portions of the side views of FIGS. 4A, 4B, 4C and 4D, respectively, enlarged for magnification purposes.

FIGS. 5A and 5B are perspective views of the neutral terminal of the plug-on neutral circuit breaker of FIG. 2A according to some aspects of the present disclosure;

FIGS. 6A and 6B are perspective views of an alternative neutral terminal for use with an alternative plug-on neutral circuit breaker according to some aspects of the present disclosure;

Figure 2A:
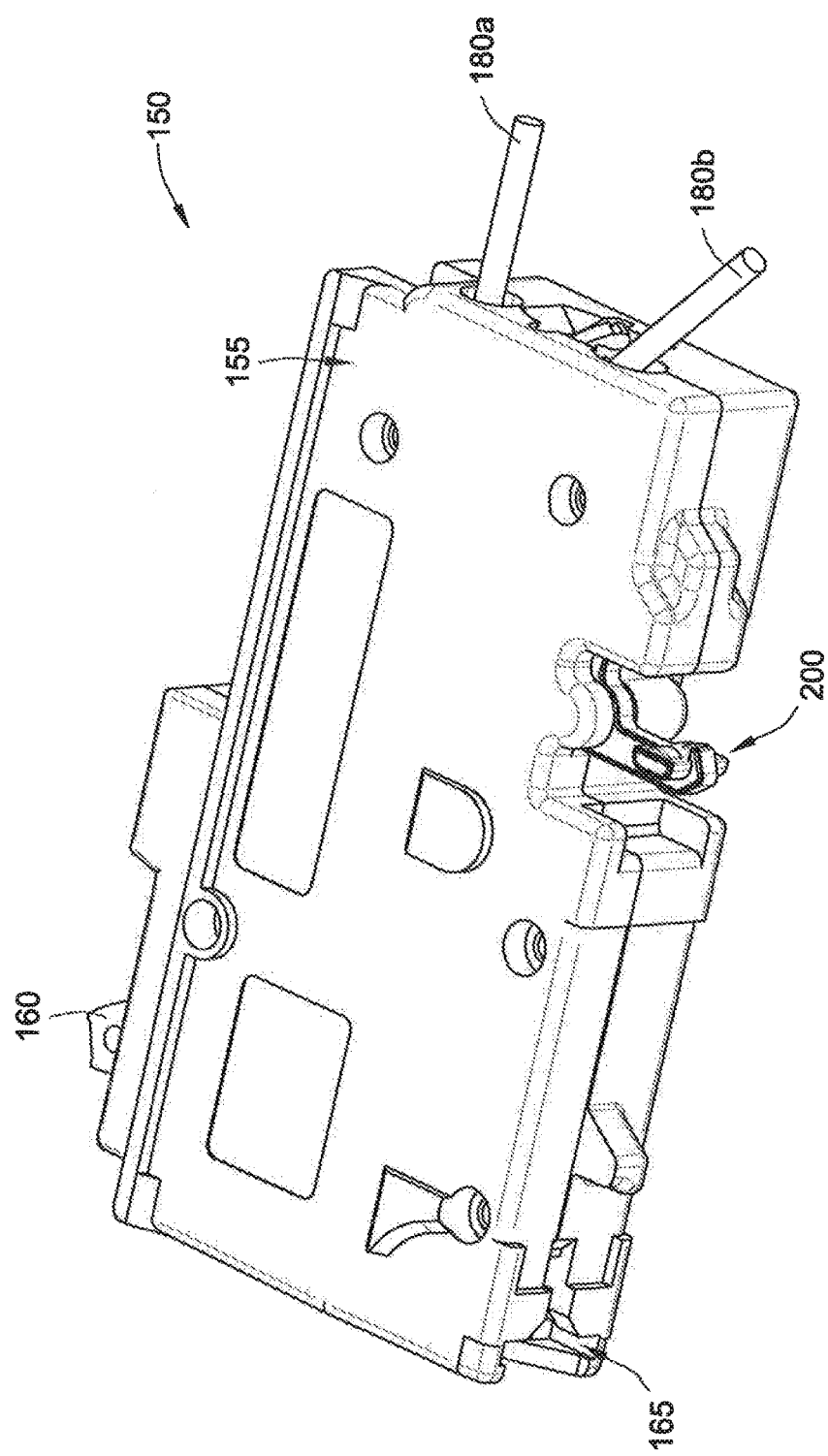
FIG. 2A is a perspective view a plug-on neutral circuit breaker with a spring-loaded, pivoting neutral terminal according to some aspects of the present disclosure.

While aspects of the present disclosure are susceptible to various modifications and alternative forms, specific embodiments or implementations have been shown by way of example in the drawings and will be described in detail herein. It should be understood, however, that this disclosure is not intended to be limited to the particular forms disclosed. Rather, this disclosure is to cover all modifications, equivalents, and alternatives falling within the spirit and scope of the invention as defined by the appended claims. Additionally, representations of some of the interior components of the plug-on neutral circuit breaker depicted in the above mentioned figures that are not involved with the neutral current path are for exemplary purposes only.

DETAILED DESCRIPTION

Referring to FIG. 1, an electrical distribution apparatus 100 includes a housing 110, an electrically insulating base plate 120 coupled to a rear wall 112 of the housing 110, a first busbar 124a, a second busbar 124b, a first neutral bar 122a, and a second neutral bar 122b. The first and the second busbars 124a,b are attached to the electrically insulating base plate 120 such that each of the busbars 124a,b is electrically insulated from each other and from the housing 110, which is typically made of a conductive metal (e.g., steel, etc.). Similarly, the first and the second neutral bars 122a,b are attached to the electrically insulating base plate 120 such that each of the neutral bars 122a,b is electrically insulated from the housing 110. In some implementations of the present disclosure, such as shown in FIG. 1, each of the busbars 124a,b and each of the neutral bars 122a,b is attached to the electrically insulating base plate 120 such that each is generally parallel with each other and with the side walls of the housing 110.

The first busbar 124a includes and/or is coupled with a plurality of stabs 126a for physically coupling with one or more circuit breakers (e.g., plug-on neutral circuit breakers 150) and for distributing a first phase of electricity supplied from an outside source to the first busbar 124a. The second busbar 124b includes and/or is coupled with a plurality of stabs 126b for physically coupling with one or more circuit breakers (e.g., plug-on neutral circuit breakers 150) and for distributing a second phase of electricity supplied from an outside source to the second busbar 124b.

Installation of one of the plug-on neutral circuit breakers 150 of the present disclosure in the electrical distribution apparatus 100 is accomplished by placing the plug-on neutral circuit breaker 150 in the housing 110 and rocking the plug-on neutral circuit breaker 150 into place, which is illustrated and described in detail below with respect to FIGS. 4A-4D and 4A1-4D1. Such an installation of the plug-on neutral circuit breaker 150 in the electrical distribution apparatus 100 results in the plug-on neutral circuit breaker 150 being electrically coupled with one of the busbars 124a,b (via one of the stabs 126a,b) and being electrically coupled with one of the neutral bars 122a,b, without having to separately attach a neutral pigtail conductor to one of the neutral bars 122a,b using the typical method of placing a stripped portion of a neutral pigtail conductor (which extends from the circuit breaker) in a pigtail receiving hole of the neutral bar 122a,b and then tightening a set screw thereon to hold the neutral pigtail conductor in place and in electrical contact with the neutral bar 122a,b. That is, the present disclosure provides a plug-on neutral circuit breaker 150 that is capable of quickly and seamlessly attaching to standard electrical distribution apparatuses (e.g., electrical distribution apparatus 100) without modification thereto and without the use of a neutral pigtail conductor to complete the neutral connection.

Figure 2B:
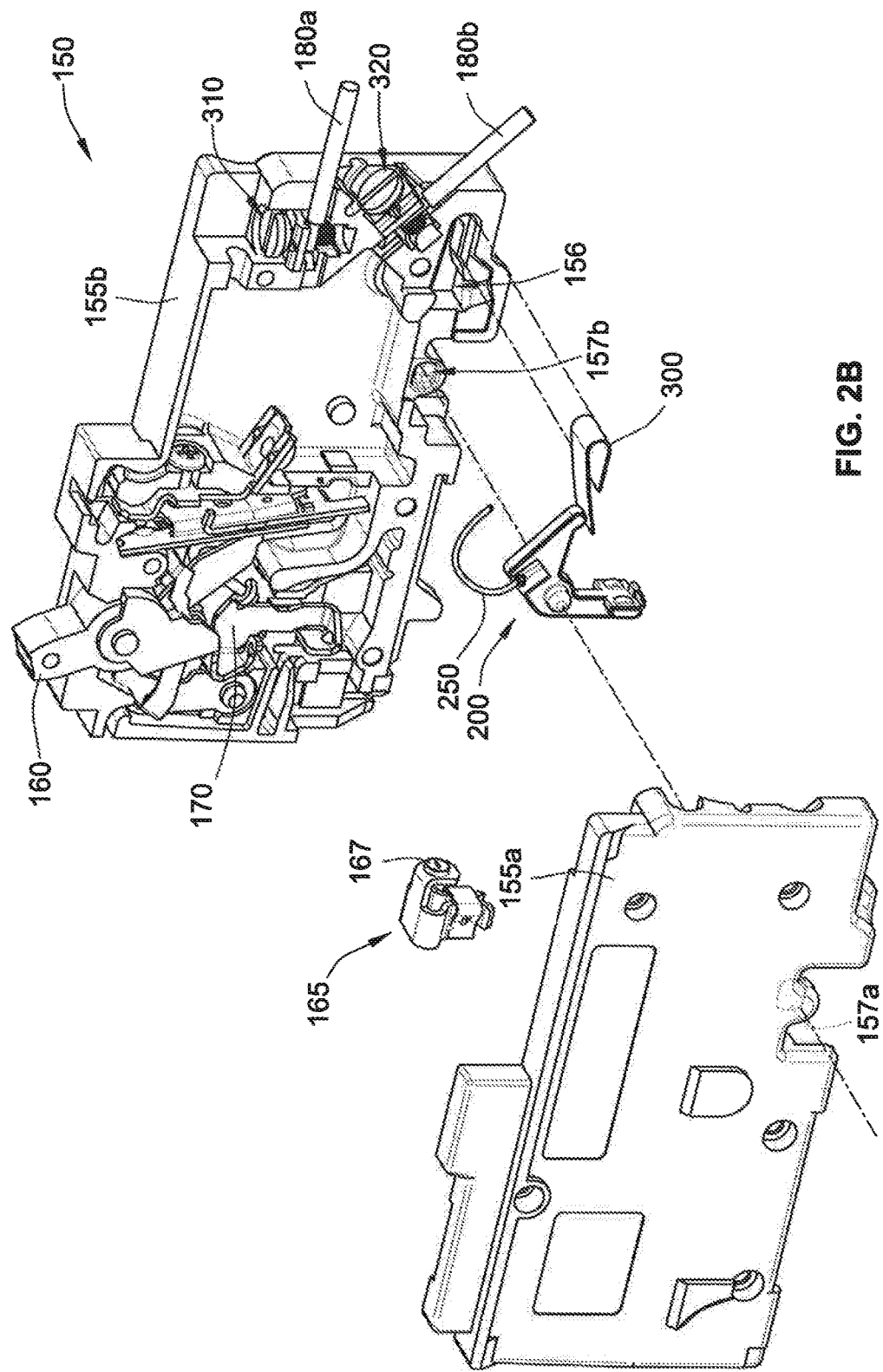
FIG. 2B is a partially exploded perspective view the plug-on neutral circuit breaker of FIG. 2A.

Referring to FIGS. 2A and 2B, the plug-on neutral circuit breaker 150 includes a housing 155 (FIG. 2A) having a first half 155a (FIG. 2B) and a second half 155b (FIG. 2B), a handle 160, a line-side jaw member 165 (best shown in FIG. 2B), and a neutral terminal 200 (best shown in FIG. 2B). The housing 155 encloses various components of the plug-on neutral circuit breaker 150 and includes an opening such that the handle 160 partially protrudes therefrom. The handle 160 can be switched between an ON position and an OFF position. When the handle 160 is in the ON position, current can travel from the line-side jaw member 165, through various components (e.g., a moveable conductive blade 170) of the plug-on neutral circuit breaker 150, to a line-out wire 180a (FIG. 2B) that is attached to a line-side electrical connector or lug 310 of the plug-on neutral circuit breaker 150. The current can then travel through a branch circuit to a load (e.g., a light bulb) and return to a neutral electrical connector or lug 320 of the plug-on neutral circuit breaker 150 via a neutral return wire 180b (FIG. 2B).

The second half 155b of the housing 155 includes a biasing-member cavity 156 that is sized and shaped to receive a biasing member 300 therein. When the biasing member 300 is positioned within the biasing-member cavity 156, the biasing member 300 is positioned to engage the neutral terminal 200 and bias the neutral terminal 200 in a first rotational direction (e.g., counterclockwise). The biasing-member cavity 156 can be formed entirely in the second half 155b of the housing 155 or in the first and the second halves 155a,b of the housing 155. The biasing member 300 is shown as a leaf spring, but the biasing member 300 can be any spring or a combination of springs, such as, for example, a coil spring, a scissor spring, a torsion spring, etc.

As best shown in FIGS. 5A and 5B, the neutral terminal 200 includes a body portion 210, a first leg 220, a second leg 230, and a neutral-wire connection site 240. The first and the second legs 220, 230 extend from the body portion 210 in two different directions. Specifically, the first leg 220 extends from the body portion 210 in a first direction, illustrated by arrow A, and the second leg 230 extends from the body portion 210 in a second direction, illustrated by the Y-axis, such that an angle, θ, exists between the legs 220, 230. The legs 220, 230 can extend in the different directions such that the angle, θ, is between about forty-five and about ninety degrees. In some implementations, the legs 220, 230 extend in the different directions such that the angle, θ, is between about sixty and about ninety degrees.

The first leg 220 of the neutral terminal 200 includes a cross member 224 that extends from the rest of the first leg 220 in a generally perpendicular fashion. The cross member 224 includes a pair of arcuate protrusions 225 that are able to directly engage one of the neutral bars 122a,b of the electrical distribution apparatus 100 when the plug-on neutral circuit breaker 150 is installed (best shown in FIGS. 4D and 4D1). The pair of protrusions 225 provides two surfaces (one on each of the protrusions 225), which aid in providing a sufficient electrical connection between the plug-on neutral circuit breaker 150 and one of the neutral bars 122a,b when the plug-on neutral circuit breaker 150 is installed.

The first leg 220 also has an end 222 that includes a lip 223 forming a hook-like structure. When the plug-on neutral circuit breaker 150 is installed in the electrical distribution apparatus 100, the end 222 of the first leg 220 hooks onto a portion of the neutral bar 122b (best shown in FIGS. 4D and 4D1) to aid in maintaining a sufficient electrical connection between the neutral terminal 200 and the neutral bar 122b.

The second leg 230 includes an end 232 that can have a variety of curved and/or straight surfaces for directly mating with the biasing member 300. For example, as shown in FIGS. 5A and 5B, the end 232 of the second leg 230 is substantially circular. However, the end 232 of the second leg 230 can have other shapes, such as, for example, an elliptical shape (not shown). By changing the shape of the end 232 of the first leg 230, the forces exerted on the neutral terminal 200 by the biasing member 300 can be changed (e.g., increased or decreased) for various displacements (e.g., compressions/bending) of the biasing member 300. For example, if an elliptical end is used (not shown), the force exerted on the neutral terminal 200 by the biasing member 300 is relatively increased for small displacements of the biasing member 300 as compared to the force that would be exerted on the neutral terminal 200 by the biasing member 300 when the end 232 of the second leg 230 is circular (shown in FIGS. 5A and 5B).

The neutral terminal 200 also includes cylindrical-shaft-like first and second axles 215a,b that protrude from the body portion 210. Specifically, the axles 215a,b protrude from the body portion 210 in a direction that is generally perpendicular to the first and the second directions that the first and the second legs 220, 230 extend from the body portion 210 of the neutral terminal 200.

Figure 3:
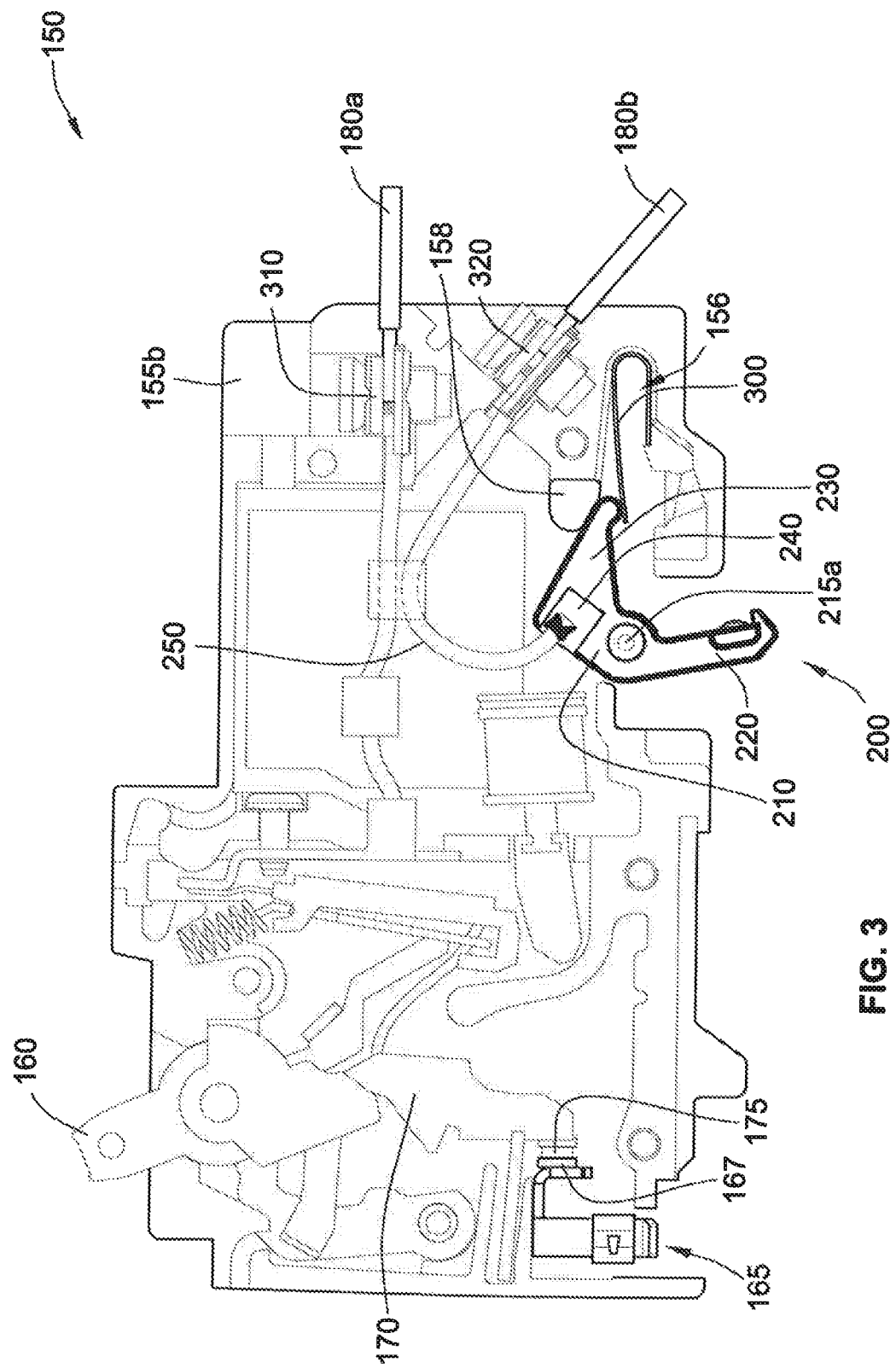
FIG. 3 is a side view of the plug-on neutral circuit breaker of FIG. 2A with a portion of its housing removed to illustrate the internal components of the plug-on neutral circuit breaker.

Referring back to FIG. 2B, the first half 155a of the housing 155 includes a first neutral-terminal-axle cavity 157a that is sized and shaped to receive and/or mate with the first axle 215a of the neutral terminal 200 (shown in FIGS. 3 and 5B). Similarly, the second half 155b of the housing 155 includes a second neutral-terminal-axle cavity 157b that is sized and shaped to receive and/or mate with the second axle 215b of the neutral terminal 200 (shown in FIG. 5A). Specifically, when the first half 155a of the housing 155 is attached to the second half 155b of the housing 155, the neutral terminal 200 is pivotally coupled to the housing 155 via the first and the second axles 215a,b being positioned within the first and the second neutral-terminal-axle cavities 157a,b.

As best shown in FIGS. 5A and 5B, the axles 215a,b have a generally cylindrical portion extending directly from the body portion 210 and a rounded/spherical-like portion extending therefrom. Various other shapes, sizes, and orientations of the axles 215a,b and of the first and the second neutral-terminal-axle cavities 157a,b are possible such that the axles 215a,b are able to mate with the first and the second neutral-terminal-axle cavities 157a,b in a pivoting relationship. For example, the axles 215a,b can be cylindrical without having rounded ends. For another example, the axles 215a,b can be in the shape of a cone. Further, in some implementations of the present disclosure, the neutral terminal 200 can be designed to only include a single axle (not shown). In some such implementations, the housing 155 can be modified accordingly to only include one of the two neutral-terminal-axle cavities 157a,b (FIG. 2B).

The neutral-terminal-axle cavities 157a,b (FIG. 2B) can be sized and shaped such that the neutral terminal 200 is constrained to move with one degree of freedom (e.g., rotation about a single axis). For example, when the neutral terminal 200 is positioned within the housing 155, the axles 215a,b can be constrained such that the neutral terminal 200 can only rotate about a central axis, $X_C$, of the axles 215a,b (shown in FIGS. 5A and 5B). In other implementations, the neutral-terminal-axle cavities 157a,b (FIG. 2B) can be sized and shaped such that the neutral terminal 200 is constrained to move with two degrees of freedom (e.g., rotation about two axes). For example, when the neutral terminal 200 is positioned within the housing 155, the axles 215a,b can be constrained such that the neutral terminal 200 can rotate about a central axis, $X_C$, of the axles 215a,b and about one additional axis that is perpendicular to the central axis of the axles 215a,b (e.g., a vertical or Y-axis shown in FIGS. 5A and 5B).

Providing the neutral terminal 200 with two degrees of rotational freedom with respect to the housing 155 enables the neutral terminal 200 to self-adjust when installed such that both of the protrusions 225 of the cross member 224 physically engage the second neutral bar 122b. In the case of a neutral terminal 200 that has one degree of freedom, the neutral terminal will not self-adjust and imperfections in the neutral bar and/or if the neutral bar is not aligned properly (e.g., parallel to the busbar) can result in only one of the protrusions 225 physically engaging the neutral bar.

Referring to FIG. 3, the plug-on neutral circuit breaker 150 is shown in the ON position (e.g., the handle 160 is in the ON position) such that the moveable conductive blade 170 is in a position forcing a moveable contact 175 into physical and electrical engagement with a stationary contact 167 of the line-side jaw member 165. The neutral terminal 200 is shown in a first rotational position or its home/resting position caused by the biasing member 300 forcing the neutral terminal in the first rotational direction (e.g., counterclockwise) such that the second leg 230 of the neutral terminal 200 is forced into contact with a stop member 158 of the second half 155b of the housing 155. The neutral terminal 200 automatically returns to its home/resting position shown in FIG. 3 when the plug-on neutral circuit breaker 150 is not installed in the electrical distribution apparatus 100.

As best shown in FIG. 3, a neutral conductor 250 electrically connects the neutral terminal 200 to the neutral electrical connector 320. The neutral conductor 250 is shown as being a partially-electrically-insulated-flexible wire that is soldered and/or welded to the neutral-wire connection site 240; however, the neutral conductor 250 can take on many other forms (e.g., one or more electrically conductive rods or bars, a braided conductor, a non-electrically insulated wire, etc.).

While the neutral conductor 250 is shown in FIG. 3 as being soldered and/or welded to the neutral-wire connection site 240 of the neutral terminal 200 (best shown in FIG. 5B), various other methods of electrically coupling the neutral conductor 250 with the neutral terminal 200 are possible. For example, a set screw (not shown) can hold the neutral conductor 250 in electrical engagement with the neutral terminal 200. For another example, a lug (not shown) can be electrically coupled to the neutral terminal 200 that is able to receive a portion of the neutral conductor 250 to hold the neutral conductor 250 in electrical engagement with the neutral terminal. For yet another example, the neutral conductor 250 can be coupled to the neutral terminal using glue (not shown). For another example, a portion of the neutral conductor 250 can be passed through an aperture (not shown) in the neutral terminal 200 and twisted back on itself to hold the neutral conductor 250 in electrical engagement with the neutral terminal.

Referring to FIGS. 4A, 4A1, 4B, 4B1, 4C, 4C1, 4D and 4D1, a sequence of illustrations demonstrates how the plug-on neutral circuit breaker 150 can be installed into the electrical distribution apparatus 100 of the present disclosure by rocking the plug-on neutral circuit breaker 150 into place without having to manually attach a separate neutral pigtail conductor (not shown) to one of the neutral bars 122a,b of the electrical distribution apparatus 100 and without having a two sided jaw member strain to clip onto/around one of the neutral bars 122a,b.

Figure 4A:
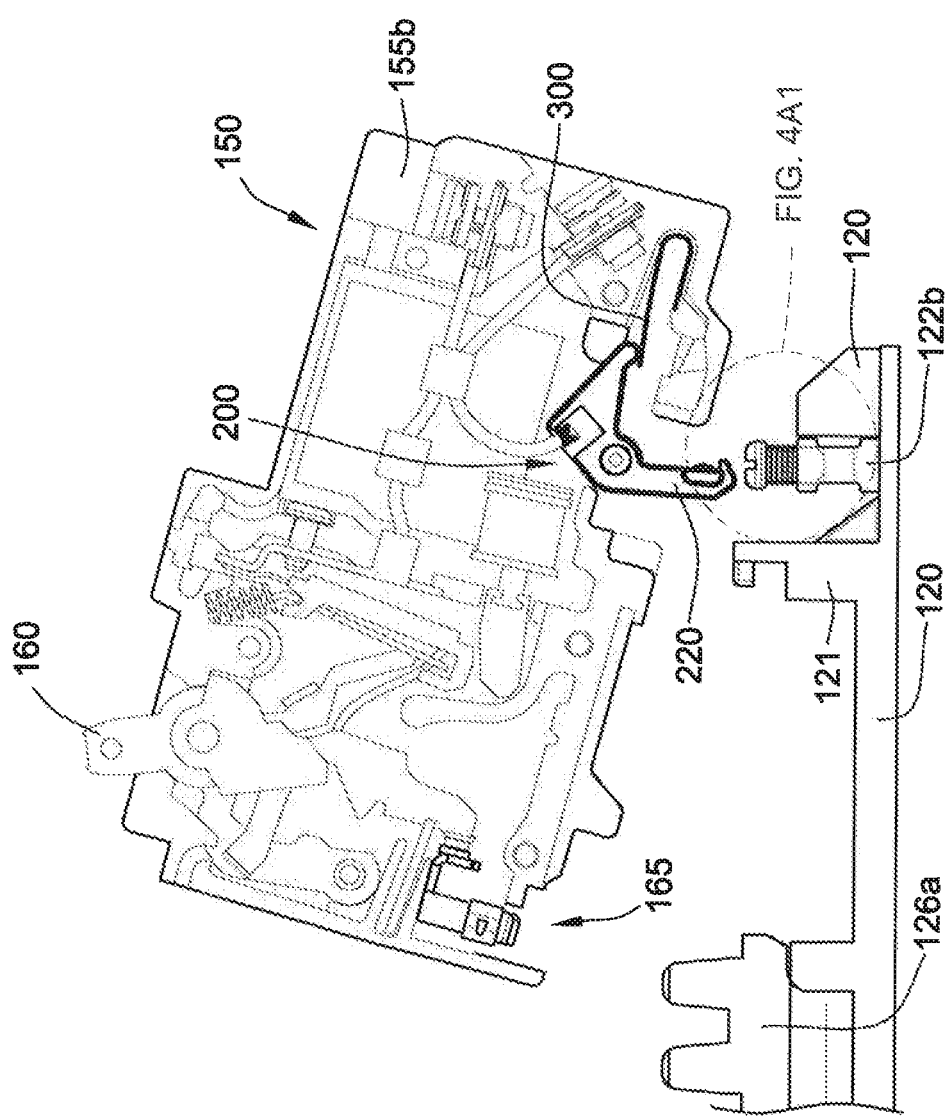

Initially, to install the plug-on neutral circuit breaker 150 in the electrical distribution apparatus 100, the plug-on neutral circuit breaker 150 is positioned adjacent to the second neutral bar 122b and one of the stabs 126a of the first busbar 124a at a slight angle relative to horizontal as shown in FIGS. 4A and 4A1. The plug-on neutral circuit breaker 150 is moved downward (e.g., toward the neutral bar 122*b* and the stab 126*a*) such that first leg 220 of the neutral terminal 200 is positioned generally between a mounting rail 121 of the insulating base plate 120 and the second neutral bar 122*b*, as shown in FIGS. 4B and 4B1. The end 222 of the first leg 220 of the neutral terminal 200 is also positioned such that the lip 223 engages/starts to engage an upper portion of the second neutral bar 122*b*, which is shown in FIGS. 4B and 4B1. The engagement of the lip 223 with the second neutral bar 122*b* during the downward movement of the plug-on neutral circuit breaker 150 causes the neutral terminal 200 to rotate slightly in a second rotational direction (e.g., clockwise), which causes the second leg 230 of the neutral terminal 200 to exert a force on the biasing member 300, thereby causing the biasing member to flex (e.g., compress, bend, deflect, etc.), which can be seen by comparing the position of the biasing member 300 in FIGS. 4A and 4B. Additionally, as the plug-on neutral circuit breaker 150 is moved downward, the line-side jaw member 165 of the plug-on neutral circuit breaker 150 is moved closer to the stab 126*a*.

Figure 4C:
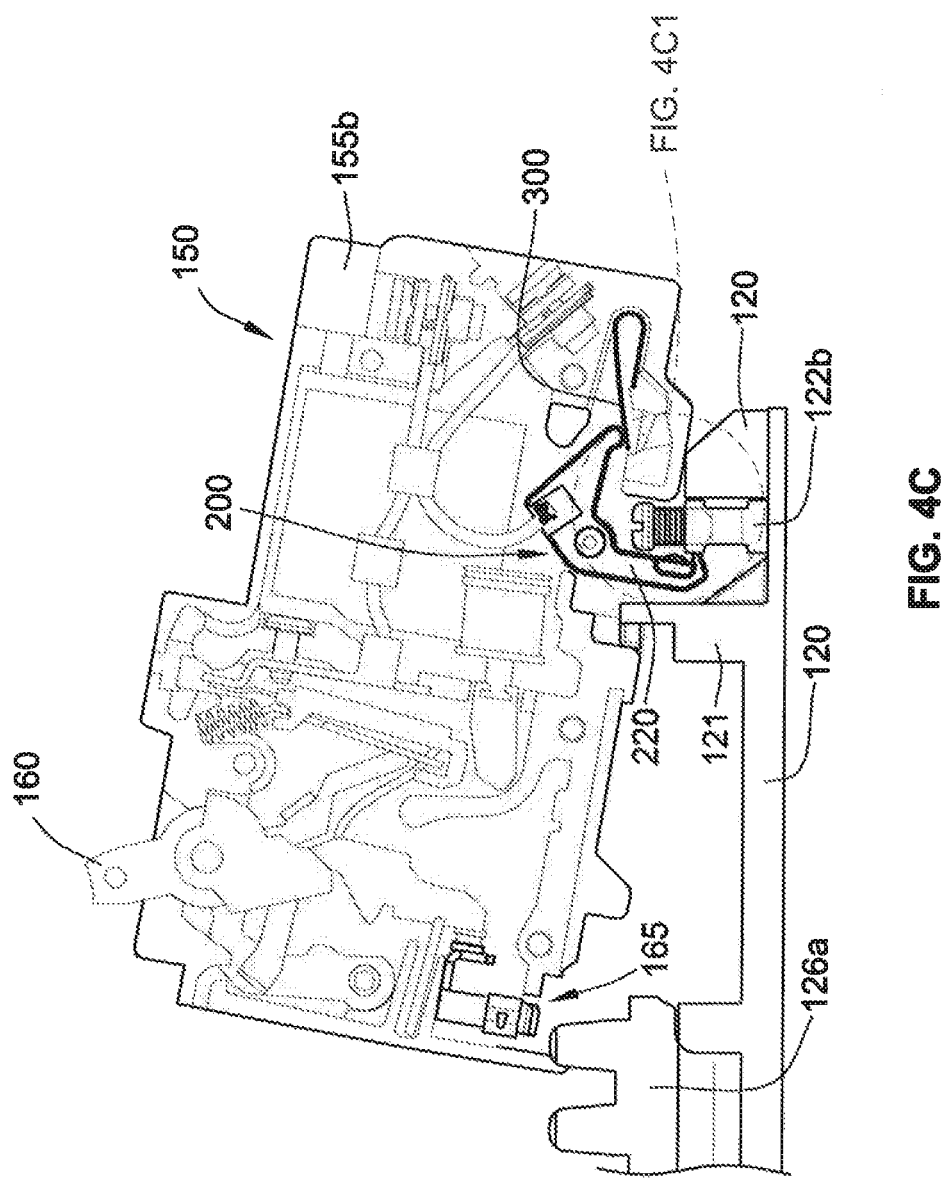

Referring to FIGS. 4C and 4C1, after the lip 223 engages the upper portion of the second neutral bar 122*b* (shown in FIGS. 4B and 4B1), the plug-on neutral circuit breaker 150 is rocked (e.g., in a counterclockwise direction) such that the lip 223 of the first leg 220 of the neutral terminal 200 moves downward, further along the second neutral bar 122*b*, and such that the line-side jaw member 165 moves closer to the stab 126*a*. Additionally, a portion of the housing 155 of the plug-on neutral circuit breaker 150 engages/begins to engage the mounting rail 121 of the insulating base plate 120. Depending on the precise rocking motion during the installation of the plug-on neutral circuit breaker 150, the biasing member 300 can deflect (e.g., compress and/or decompress) during the continued downward movement/rocking of the plug-on neutral circuit breaker 150 illustrated from FIG. 2B to 2C.

Referring to FIGS. 4D and 4D1, the plug-on neutral circuit breaker 150 is further rocked (e.g., in the counterclockwise direction) such that the plug-on neutral circuit breaker 150 is completely installed in the electrical distribution apparatus 100 as shown. Specifically, from FIGS. 4C/4C1 to FIGS. 4D/4D1, the plug-on neutral circuit breaker 150 is further rocked into place such that one or both of the protrusions 225 of the cross member 224 of the first leg 220 of the neutral terminal 200 directly engage the second neutral bar 122*b*. Additionally, the plug-on neutral circuit breaker 150 is further rocked into place such that the line-side jaw member 165 directly engages a portion of the stab 126*a*, thereby electrically coupling the line-side jaw member 165 with the first busbar 124*a* (FIG. 1). Further, the housing 155 is positioned such that a lower portion thereof abuts and/or is proximate to the mounting rail 121.

When the plug-on neutral circuit breaker 150 is rocked into its installed position (FIGS. 4D and 4D1), the lip 223 hooks under a portion of the second neutral bar 122*b*, which aids in retaining the neutral terminal 200 in engagement therewith. Further, the installation of the plug-on neutral circuit breaker 150 can be confirmed by tactile feedback that emanates from the engagement of the lip 223 under the second neutral bar 122*b* and transmits through the housing 155 of the circuit breaker 150. For example, the movement of the neutral terminal 200 between FIGS. 4C/4C1 and 4D/4D1 (e.g., caused by the biasing member 300) can result in the first leg 220 snapping against the second neutral bar 122*b* causing an audible sound (e.g., a clicking or snapping sound) in addition to the tactile feedback sensed by the clicking action of the lip 223 to the neutral bar 122*b*.

Thus far the present disclosure has focused on the plug-on neutral circuit breaker 150 having the neutral terminal 200 shown in FIGS. 5A and 5B; however, various other types, sizes, and orientations of neutral terminals are contemplated. Several specific examples of such alternative neutral terminals are shown in FIGS. 6A-8B, which are discussed in detail below.

Referring to FIGS. 6A and 6B, a neutral terminal 400 includes a base portion 410, a first leg 420, and a second leg 430, which are similar to and/or or have similar functions as the base portion 210, the first leg 220, and the second leg 230 of the neutral terminal 200 shown in FIGS. 5A and 5B and as described herein.

Specifically, the first and the second legs 420, 430 extend from the body portion 410 in two different directions. The first leg 420 of the neutral terminal 400 includes a cross member 424 that extends from the rest of the first leg 420. The cross member 424 includes a pair of hemispherical protrusions 425 that are able to directly engage one of the neutral bars 122*a,b* of the electrical distribution apparatus 100 when a plug-on neutral circuit breaker including the neutral terminal 400 is installed in the same, or similar, manner as the pair of protrusions 225 as described herein.

The first leg 420 also has an end 422 that includes a lip 423 forming a hook-like structure. When the plug-on neutral circuit breaker including the neutral terminal 400 is installed in the electrical distribution apparatus 100, the end 422 of the first leg 420 hooks onto a portion of one of the neutral bars 122*a,b* to aid in maintaining a sufficient electrical connection between the neutral terminal 400 and the neutral bar. Further, the second leg 430 includes an end 432 that can have a variety of curved and/or straight surfaces for directly mating with the biasing member 300 in the same, or similar, manner as described herein with respect to the end 232 of the neutral terminal 200.

Unlike the neutral terminal 200, the neutral terminal 400 does not include cylindrical-shaft-like first and second axles that protrude from the body portion 410. Rather, the neutral terminal 400 includes an aperture 416 that is sized and shaped to receive an axle or shaft (not shown) therein for mounting the neutral terminal 400 to the housing of a plug-on neutral circuit breaker (not shown) in a pivotal fashion. Generally, one or both halves of the housing of such a plug-on neutral circuit breaker can include an axle and/or shaft that protrudes therefrom and is able to receive the neutral terminal 400 thereon in a slidable fashion such that the neutral terminal 400 can rotate about the axle and/or shaft with one or more (e.g., two, three) degrees of rotational freedom. Alternatively, an axle/shaft (not shown) that is not an integral portion of the housing of the plug-on neutral circuit breaker can be coupled with the neutral terminal 400 and then positioned within the housing of the plug-on neutral circuit breaker.

Figure 7A:
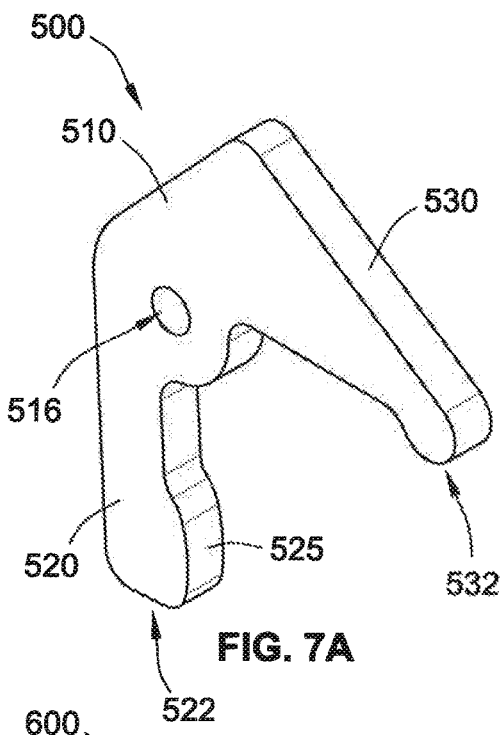
FIGS. 7A and 7B are perspective views of an alternative neutral terminal for use with an alternative plug-on neutral circuit breaker according to some aspects of the present disclosure.
Figure 7B:
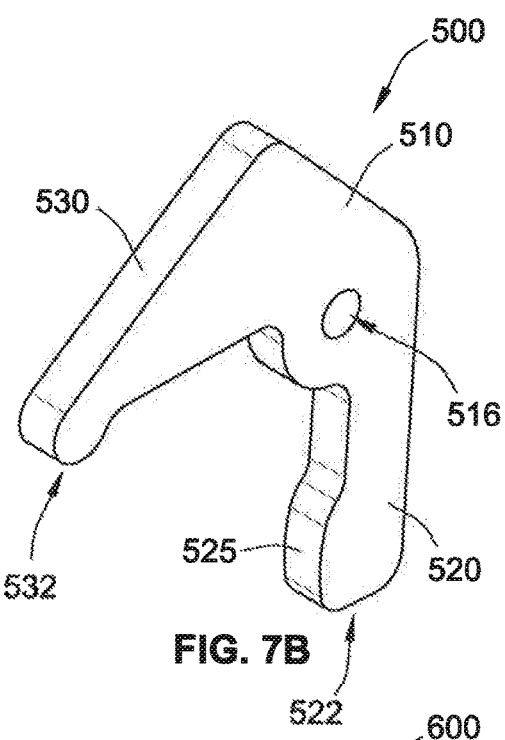

Referring to FIGS. 7A and 7B, a neutral terminal 500 includes a base portion 510, a first leg 520, and a second leg 530, which are similar to and/or or have similar functions as the base portion 210, the first leg 220, and the second leg 230 of the neutral terminal 200 shown in FIGS. 5A and 5B and as described herein.

Specifically, the first and the second legs 520, 530 extend from the body portion 510 in two different directions. The first leg 520 of the neutral terminal 500 includes a protrusion and/or surface 525 that is able to directly engage one of the neutral bars 122*a,b* of the electrical distribution apparatus 100 when a plug-on neutral circuit breaker including the neutral terminal 500 is installed in the same, or similar, manner as the pair of protrusions 225 as described herein.

The first leg 520 also has an end 522; however, unlike the end 222 of the first leg 220 of the neutral terminal 200, the end 522 does not include a lip forming a hook-like structure. The second leg 530 includes an end 532 that can have a variety of curved and/or straight surfaces for directly mating with the biasing member 300 in the same, or similar, manner as described herein with respect to the end 232 of the neutral terminal 200.

Like the neutral terminal 400 and unlike the neutral terminal 200, the neutral terminal 500 does not include cylindrical-shaft-like first and second axles that protrude from the body portion 510. Rather, the neutral terminal 500 includes an aperture 516 that is sized and shaped to receive an axle or shaft (not shown) therein for mounting the neutral terminal 500 to the housing of a plug-on neutral circuit breaker (not shown) in a pivotal fashion in the same, or similar, fashion as the neutral terminal 400 described herein in reference to FIGS. 6A and 6B.

Figure 8A:
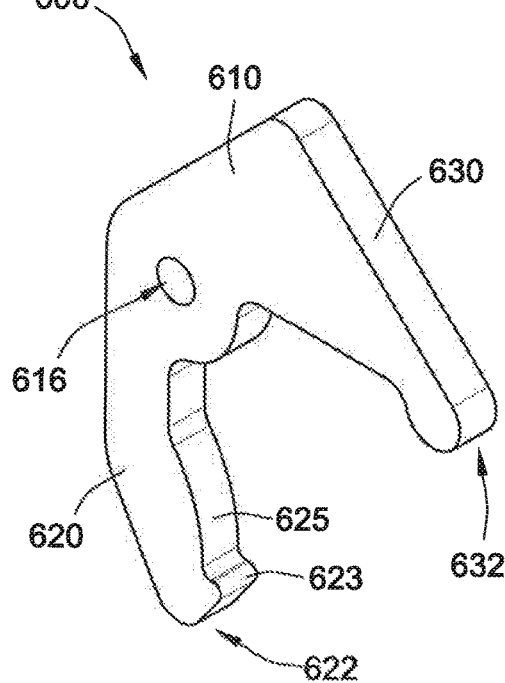
FIGS. 8A and 8B are perspective views of an alternative neutral terminal for use with an alternative plug-on neutral circuit breaker according to some aspects of the present disclosure.
Figure 8B:
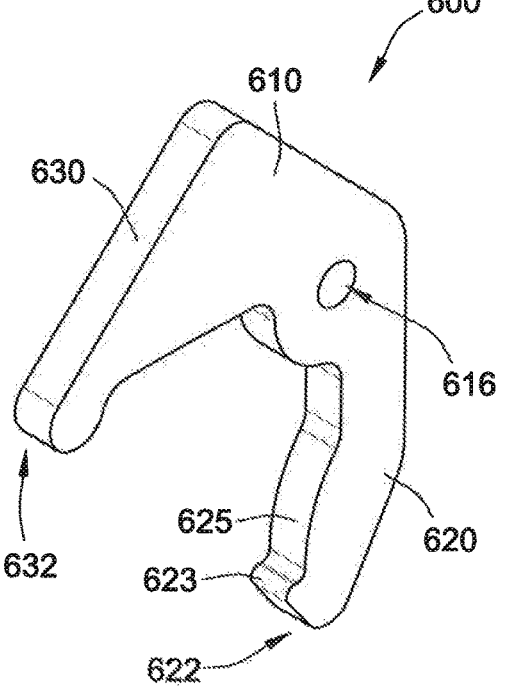

Referring to FIGS. 8A and 8B, a neutral terminal 600 includes a base portion 610, a first leg 620, and a second leg 630, which are similar to and/or or have similar functions as the base portion 210, the first leg 220, and the second leg 230 of the neutral terminal 200 shown in FIGS. 5A and 5B and as described herein.

Specifically, the first and the second legs 620, 630 extend from the body portion 610 in two different directions. The first leg 620 of the neutral terminal 600 includes a protrusion and/or surface 625 that is able to directly engage one of the neutral bars 122a,b of the electrical distribution apparatus 100 when a plug-on neutral circuit breaker including the neutral terminal 600 is installed in the same, or similar, manner as the pair of protrusions 225 as described herein.

The first leg 620 also has an end 622 that includes a lip 623 forming a hook-like structure. When the plug-on neutral circuit breaker including the neutral terminal 600 is installed in the electrical distribution apparatus 100, the end 622 of the first leg 620 hooks onto a portion of one of the neutral bars 122a,b to aid in maintaining a sufficient electrical connection between the neutral terminal 600 and the neutral bar. Further, the second leg 630 includes an end 632 that can have a variety of curved and/or straight surfaces for directly mating with the biasing member 300 in the same, or similar, manner as described herein with respect to the end 232 of the neutral terminal 200.

Like the neutral terminals 400, 500 and unlike the neutral terminal 200, the neutral terminal 600 does not include cylindrical-shaft-like first and second axles that protrude from the body portion 610. Rather, the neutral terminal 600 includes an aperture 616 that is sized and shaped to receive an axle or shaft (not shown) therein for mounting the neutral terminal 600 to the housing of a plug-on neutral circuit breaker (not shown) in a pivotal fashion in the same, or similar, fashion as the neutral terminal 400 described herein in reference to FIGS. 6A and 6B.

The alternative neutral terminals 400, 500, and 600 can be formed by a variety of processes. For example, the neutral terminals 400, 500, and 600 can be formed by stamping them from a sheet of metal (e.g., steel, copper, nickel, aluminum, etc., or any combinations thereof. For another example, the neutral terminals 400, 500, and 600 can be formed by pouring liquid metal into corresponding forms/molds.

While not specifically shown in FIGS. 6A-8B, each of the alternative neutral terminals 400, 500, and 600 includes a neutral-wire connection site that is the same as, or similar to, the neutral-wire connection site 240 of the neutral terminal 200 and is able to be coupled with a neutral conductor such as the neutral conductor 250 described herein.

The various neutral terminals 200, 400, 500, and 600 of the present disclosure all extend from the housing of a plug-on neutral circuit breaker (e.g., the plug-on neutral circuit breaker 150) such that a leg of the neutral terminal (e.g., the first leg 220, 420, 520, 620) physically engages (e.g., touches) only one side of one of the neutral bars 122a,b. Further, the one leg is biased to maintain contact with only one side of the adjacent one of the neutral bars 122a,b.

According to some implementations of the present disclosure, when the plug-on neutral circuit breaker 150—including any one of the various neutral terminals 200, 400, 500, and 600 described herein—is installed in the electrical distribution apparatus 100, the neutral terminal 200, 400, 500, and 600 exerts a contact force on the neutral bar between about two pounds and about ten pounds. More specifically, the neutral terminal 200, 400, 500, and 600 is able to exert a contact force on the neutral bar between about two pounds and about five pounds. The exertion of such contact force (e.g., between two and ten pounds) on the neutral bar by the neutral terminal is sufficient to maintain an electrical connection therebetween.

According to some implementations of the present disclosure, the biasing member 300 is preloaded such that when the plug-on neutral circuit breaker 150 is in the home/resting position (as shown in FIGS. 3 and 4A), the biasing member exerts a preload force on the second leg 230 of the neutral terminal 200. As such, a greater than zero force is exerted on the neutral terminal by the biasing member 300 at small deflections. Further, the preloaded biasing member 300 aids in providing a substantially consistent contact force between the neutral terminal and the neutral bar regardless of the relative rotational position of the neutral terminal.

While particular embodiments and applications of the present disclosure have been illustrated and described, it is to be understood that the disclosure is not limited to the precise construction and compositions disclosed herein and that various modifications, changes, and variations can be apparent from the foregoing descriptions without departing from the spirit and scope of the invention as defined in the appended claims.

What is claimed is:

1. A plug-on neutral circuit breaker that couples with a neutral bar of an electrical distribution apparatus, the plug-on neutral circuit breaker comprising:
   a housing;
   a neutral terminal pivotally coupled to the housing, the neutral terminal including a body portion, a first leg, and a second leg, the first leg extending from the body portion in a first direction and the second leg extending from the body portion in a second direction;
   a biasing member positioned within the housing and configured to engage the second leg of the neutral terminal, thereby biasing the neutral terminal in a first rotational direction such that a portion of the first leg of the neutral terminal is urged into contact with the neutral bar of the electrical distribution apparatus in response to the plug-on neutral circuit breaker being installed in the electrical distribution apparatus;
   a handle at least partially protruding from the housing, the handle being moveable between an ON position and an OFF position;
   a moveable conductive blade positioned within the housing and operably coupled to the handle;

a moveable contact directly attached to the moveable conductive blade; and a line-side jaw member including a pair of legs and being coupled to a stationary contact, the stationary contact being configured to be electrically coupled with the moveable contact in response to the handle being in the ON position, thereby electrically coupling the line-side jaw member with a line-side electrical connector of the plug-on neutral circuit breaker, each of the legs of the line-side jaw member being configured to electrically couple with a busbar of the electrical distribution apparatus in response to the plug-on neutral circuit breaker being installed in the electrical distribution apparatus.

2. The plug-on neutral circuit breaker of claim 1, wherein the neutral terminal is pivotally coupled to the housing such that the neutral terminal has one degree of freedom.

3. The plug-on neutral circuit breaker of claim 1, wherein the neutral terminal is pivotally coupled to the housing such that the neutral terminal has two degrees of freedom.

4. The plug-on neutral circuit breaker of claim 1, wherein the second direction is between about sixty and about ninety degrees from the first direction.

5. The plug-on neutral circuit breaker of claim 1, wherein the second direction is between about forty-five and about ninety degrees from the first direction.

6. The plug-on neutral circuit breaker of claim 1, wherein the body portion of the neutral terminal includes one or more axles protruding therefrom in a third direction that is generally perpendicular to the first direction and the second direction.

7. The plug-on neutral circuit breaker of claim 6, wherein the housing includes one or more slots and wherein each of the one or more axles of the neutral terminal is configured to be received in a corresponding one of the one or more slots, thereby pivotally coupling the neutral terminal to the housing.

8. The plug-on neutral circuit breaker of claim 7, wherein each of the one or more axles is generally cylindrical and each of the one or more slots has a corresponding generally cylindrical shape such that the neutral terminal is pivotally coupled to the housing with one degree of rotational freedom.

9. The plug-on neutral circuit breaker of claim 7, wherein at least a portion of each of the one or more axles has a generally spherical shape and each of the one or more slots is shaped such that the neutral terminal is pivotally coupled to the housing with two degrees of rotational freedom.

10. The plug-on neutral circuit breaker of claim 1, wherein the first leg includes two or more protrusions configured to electrically engage the neutral bar.

11. The plug-on neutral circuit breaker of claim 10, wherein each of the two or more protrusions has a generally hemispherical surface.

12. A plug-on neutral circuit breaker that couples with a neutral bar of an electrical distribution apparatus, the plug-on neutral circuit breaker comprising:

a housing;

a neutral terminal pivotally coupled to the housing, the neutral terminal including a body portion, a first leg, and a second leg, the first leg extending from the body portion in a first direction and the second leg extending from the body portion in a second direction; and a biasing member positioned within the housing and configured to engage the second leg of the neutral terminal, thereby biasing the neutral terminal in a first rotational direction such that a portion of the first leg of the neutral terminal is urged into contact with the neutral bar of the electrical distribution apparatus in response to the plug-on neutral circuit breaker being installed in the electrical distribution apparatus, wherein the neutral terminal is electrically coupled to a neutral electrical connector of the plug-on neutral circuit breaker via a neutral conductor and wherein the body portion of the neutral terminal includes a neutral-wire connection site configured to be electrically coupled with the neutral conductor.

13. An electrical distribution apparatus, comprising:

a housing having a rear wall;

a busbar coupled to the rear wall of the housing and being configured to distribute current to circuit breakers coupled thereto;

a neutral bar positioned in the housing and coupled to the rear wall; and a plug-on neutral circuit breaker, including:

a circuit breaker housing;

a neutral terminal pivotally coupled to the circuit-breaker housing and electrically coupled to a neutral electrical connector of the plug-on neutral circuit breaker via a neutral conductor, the neutral terminal including a body portion, a first leg, and a second leg, the first leg extending from the body portion in a first direction and the second leg extending from the body portion in a second direction, the neutral terminal being positioned partially within the circuit-breaker housing such that at least a portion of the first leg partially protrudes from the circuit-breaker housing; and a biasing member positioned within the circuit-breaker housing and configured to engage the second leg of the neutral terminal, thereby biasing the neutral terminal in a first rotational direction such that the portion of the first leg of the neutral terminal is urged into contact with the neutral bar in response to the plug-on neutral circuit breaker being installed in the electrical distribution apparatus.

14. The electrical distribution apparatus of claim 13, wherein the neutral bar is generally rectangular and includes pigtail receiving holes.

15. The electrical distribution apparatus of claim 13, wherein the plug-on neutral circuit breaker is installed in the electrical distribution apparatus when a line-side jaw member of the plug-on neutral circuit breaker is electrically coupled with the busbar and when the portion of the first leg of the neutral terminal is electrically coupled with the neutral bar.

16. The electrical distribution apparatus of claim 13, wherein the body portion of the neutral terminal includes one or more axles protruding therefrom in a third direction that is generally perpendicular to the first direction and the second direction, and wherein the circuit-breaker housing includes one or more slots, each of the one or more axles of the neutral terminal being configured to be received in a corresponding one or the one or more slots, thereby pivotally coupling the neutral terminal to the circuit-breaker housing.

17. The electrical distribution apparatus of claim 16, wherein the neutral terminal is pivotally coupled to the circuit-breaker housing such that the neutral terminal has one degree of rotational freedom.

18. The electrical distribution apparatus of claim 16, wherein the neutral terminal is pivotally coupled to the circuit-breaker housing such that the neutral terminal has two degrees of rotational freedom.

* * * * *